(12) United States Patent
Lammerant

(10) Patent No.: US 7,669,712 B2
(45) Date of Patent: Mar. 2, 2010

(54) STORAGE CASE FOR RECEIVING DATA DISKS

(75) Inventor: Filip Lammerant, Thulin (BE)

(73) Assignee: Cartonneries de Thulin S.A., Thulin (BE)

( * ) Notice: Subject to any disclaimer, the term of this patent is extended or adjusted under 35 U.S.C. 154(b) by 569 days.

(21) Appl. No.: 10/599,915

(22) PCT Filed: Mar. 16, 2005

(86) PCT No.: PCT/EP2005/002768

§ 371 (c)(1),
(2), (4) Date: Mar. 8, 2007

(87) PCT Pub. No.: WO2005/106883

PCT Pub. Date: Nov. 10, 2005

(65) Prior Publication Data

US 2007/0221520 A1    Sep. 27, 2007

(30) Foreign Application Priority Data

Apr. 14, 2004    (DE)    ........................ 10 2004 018 551

(51) Int. Cl.
*B65D 85/57* (2006.01)
(52) U.S. Cl. ..................... 206/310; 206/308.1; 206/493
(58) Field of Classification Search ................. 206/310, 206/308.1, 309, 312, 493, 308.2; 211/41.12, 211/40
See application file for complete search history.

(56) References Cited

U.S. PATENT DOCUMENTS

| | | | |
|---|---|---|---|
| 5,788,068 A | 8/1998 | Fraser et al. | |
| 6,196,384 B1 * | 3/2001 | Belden, Jr. ............... | 206/308.1 |
| 6,206,186 B1 * | 3/2001 | Cerda-Vilaplana et al. ....... | 206/308.1 |
| 6,237,763 B1 * | 5/2001 | Lau .......................... | 206/308.1 |
| 6,276,524 B1 | 8/2001 | Cerda-Vilaplana et al. | |
| 6,364,108 B1 | 4/2002 | Bin | |
| 6,427,833 B1 * | 8/2002 | Hui ........................... | 206/310 |
| 6,502,694 B1 | 1/2003 | Pijanowski et al. | |
| 6,779,659 B2 * | 8/2004 | Marsilio et al. .......... | 206/308.1 |
| 2001/0047947 A1 * | 12/2001 | Lau ............................. | 206/310 |
| 2003/0034258 A1 * | 2/2003 | Lee .......................... | 206/308.1 |
| 2003/0102232 A1 | 6/2003 | Marsilio et al. | |

(Continued)

FOREIGN PATENT DOCUMENTS

DE        34 25 579 A1    1/1986

(Continued)

*Primary Examiner*—David T Fidei
(74) *Attorney, Agent, or Firm*—Gudrun E. Huckett

(57) ABSTRACT

A storage case has a base and a lid parallel to the base. The base has a rigid base plate with a rigid support for a data disk that stores digital information. The base has a fastening zone arranged centrally on the base plate and connected to the base plate by springy radial sections. The fastening zone has a central rigid pressure element and tongues distributed about the pressure element for securing positively the data disk. The tongues have integral snap-on cams projecting past an edge of a central opening of the data disk resting on the support. The radial sections have inner ends connected directly to the pressure element. The tongues are connected by a bending location to the inner ends. The support is arranged directly about the radial sections so as to be proximal to the edge of the central disk opening.

15 Claims, 3 Drawing Sheets

U.S. PATENT DOCUMENTS

2003/0136689 A1* 7/2003 Mathieu ............ 206/310
2004/0123311 A1   6/2004 Farrar et al.

FOREIGN PATENT DOCUMENTS

| DE | 37 15 187 A1 | 11/1988 |
| EP | 0 429 195 A2 | 5/1991 |
| WO | 02/31831 A1 | 4/2002 |
| WO | 2004/022454 A1 | 3/2004 |

* cited by examiner

STORAGE CASE FOR RECEIVING DATA DISKS

BACKGROUND OF THE INVENTION

The invention relates to a storage case for at least one data disk, in particular, a compact disc (CD) or a digital versatile disc (DVD), that stores digital information and is provided with a central opening, the storage case comprised of a base for receiving the data disc and a lid parallel to the base, wherein the base comprises a substantially rigid base plate and a support for the information disc that is provided at the base plate and is also rigid, a fastening zone arranged at the center of the base plate and con nected thereto by springy radial sections and having a centrally arranged rigid pressure element as well as tongues, distributed about the pressure element and securing the data disk positively and provided with integrally formed snap-on cams that project slightly past the edge of the opening of the data disk when resting on the support.

For storing such data disks, a variety of different storage cases are available on the market. The cases have in common that the data disks are fixed on a base by means of circularly arranged clamping elements that engage the central opening of the data disk and secure it in this way in a horizontal direction on the base. For fixation of the data disks in the vertical direction, snap-on cams of the clamping elements engage the central opening of the data disk. By applying a vertical pulling force on the data disk, the clamping elements are loaded such that when a sufficiently large force is reached they move elastically inwardly and release the CD. In particular in the case of data disks having a dual-layer configuration like digital versatile disks (DVD), this clamping technology has been found to be disadvantageous because the high removal forces, in particular in the case of improper removal, for example, when gripping only one side of the DVD, can cause destruction of the DVD.

For avoiding this problem, storage cases are disclosed in EP 0 789 914 B1 that enable the release of the data disk by one hand by actuating with a finger a centrally arranged mechanism that is of a simple configuration and is characterized by minimal removing forces acting on the data disk. This mechanism is comprised essentially of clamping elements attached to springy arms and provided with engagement means for the data disk, wherein the clamping elements by being pressed down together can be lowered through the central opening of the data disk. This lowering of the two clamping elements including the snap-on cams is realized along a circular path. When the engagement provided by the clamping elements is released upon reaching the required lowering travel, the data disk is lifted by means of a mechanism comprised of four springy supports to a level above the upper terminal position of engagement of the clamping elements. Reliable removal of the CD depends on the dexterity of the operator, since, for example, a pressure force that is not applied precisely centrally leads to a non-uniform compression of the clamping elements so that the data disk will assume a slanted position, will cant, and possibly cannot be removed easily.

A storage case of the aforementioned kind is disclosed in EP 0 896 719 B1 in which the release of the data disk is realized by pressing a finger onto a centrally arranged pressure element. The pressure element is comprised essentially of three spring arms projecting from a base inwardly and having a circular segment rigidly attached to their ends, respectively. The arms with the rigidly attached circular segments are inwardly connected in a pivotable way to a substantially triangular central part. For engaging the data disk snap-on cams are formed on the circular segments. For removing the data disk, the central part is pressed down so that the arms are compressed elastically and the circular segments attached to their ends will move downwardly on a circular path similar to EP 0 798 914 B1. The reliability of the removal action is however a problem. This is so because it cannot be excluded that upon restoring action of the radial arms the data disk is locked again because the arms follow the same circular path upon return movement. Moreover, it has also been found to be disadvantageous that the precise point in time of release of the data disks, i.e., the release of engagement, can be detected by the user only with difficulties so that it depends on the user's dexterity to correctly catch this point in time. Should the user release the central element too early, the central element will spring back in the upward direction with the data disk still being secured and not yet in the removable state.

SUMMARY OF THE INVENTION

Based on the latter prior art, it is an object of the invention to provide a storage case for receiving one or several data disks in which the data disk, independent of the dexterity of the user, is reliably releasable and removable with reproducible force action.

As a solution to this object it is proposed that the inner ends of the springy radial sections are connected directly to the central pressure element, that the tongues are connected by means of at least one bending location to the inner ends of the springy radial sections, and that the support for the data disk is arranged immediately about the radial sections proximal to the edge of the opening of the data disk.

With this construction, a reliable release and removal of the data disk is ensured. The immediate connection of the inner ends of the springy radial sections to the central pressure element and the connection of the tongues by means of at least one bending location to the inner ends of the springy radial sections has the result that the snap-on cams securing positively the data disk are lowered vertically and not along a circular path. Upon downward movement of the central pressure element, the tongues deflect inwardly until, below the data disk, they spring back in the outward direction. The restoring action of the central pressure element into its initial position is counteracted only by the weight force of the data disk, but this weight force is not sufficient in order to allow the tongues to elastically move inwardly so that the data disk rests on the topside of the snap-on cams. In this position, its rim can be gripped easily.

A yielding spring action of the data disk itself is limited in that the support for the data disk is arranged immediately about the radial sections proximal to the edge of the opening of the data disk. Since friction forces that occur upon lowering of the snap-on cams through the central opening create only a minimal moment about the support, the bending load of the data disk, on the one hand, is minimal and, on the other hand, is also reproducible. In this way, actuation by a finger not precisely centrally is without negative effect on reliable removal of the CD/DVD because of the minimal radial spacing between the support and the central pressure element.

In an advantageous embodiment of the invention, it is proposed that the radial sections extend in the area between the support for the data disk and the fastening zone. In this way, the springy radial sections are delimited and the support can be rigid about its circumference.

Moreover, it is proposed that the fastening zone can be lowered by applying a force that acts essentially perpendicular to the base plate along a central axis of the central pressure element and opposite to the restoring force of the springy radial sections so that it is ensured that the central pressure element will not be lowered along a circular path but along a vertical line so that the data disk upon return movement of the radial sections is reliably entrained, i.e. lifted. Advantageously, the maximum lowering travel of the fastening zone is at least identical to the total height of the data disks received thereat in order to be able to lift several data disks into the removal position with a single actuation of the pressure element.

The present invention further proposes that the central pressure element is formed by a rigid pin provided about its circumference with recesses, wherein the pin is closed off at the bottom in the areas provided with the recesses with a bottom plate. In each recess of the pressure element at least one tongue can be arranged advantageously, wherein the tongue is essentially parallel to the central axis of the fastening zone. With this configuration, the tongues and the pressure element can be integrated in a space-saving way in the area of the fastening zone.

It is also advantageous that the rigid circumferential areas of the pressure element remaining between the recesses contribute to centering the data disk, preferably together with the springy tongues. Moreover, the tongues arranged in the recesses can contribute with their outer sides also to the centering action wherein the contact surface of the central opening of the data disk is increased.

In a particularly advantageous embodiment of the invention it is proposed that the tongues are elastic in the radial direction. With this elasticity of the tongues in the radial direction, the friction force or removal force acting on the data disk is reduced because the tongues move inwardly during lowering already at minimal transverse forces and, in this way, friction on the inner side of the center opening is reduced.

A further embodiment of the invention provides that the snap-on cams at their bottom side are provided with a slanted portion. By means of this slanted portion the deflection of the tongues at the beginning of the lowering action is facilitated and the friction forces are reduced in this way.

Moreover, it is advantageous when the springy zone that is formed by the radial sections is provided with cutouts. By means of these cutouts, the different circumferential areas of the fastening zone are imparted with different tension states. For example, certain areas can be removed from the flow of force of the compression forces and can therefore be kept almost without any tension.

Advantageously, the tongues and the cutouts are provided on the same circumferential sections that are essentially free of tension because of the cutouts so that the tongues are arranged also within the tension-free area of the fastening zone. With the aid of this arrangement, the tongues move inwardly upon lowering only when a data disk has been inserted. If this is not so, the tongues are only entrained in the vertical direction; they are immobile relative to the central pressure element.

According to a further configuration, the width of the cutouts is at least identical to the width of the tongues; this is additionally beneficial for the desired tension distribution about the circumferential area of the fastening zone.

According to a further embodiment, it is proposed that the bending locations for returning the tongues are located only in the circumferential areas of the fastening zone provided with the recesses wherein the remaining circumferential areas of the fastening zone are substantially rigid. This configuration also leads to a reduction of the removal forces acting on the data disk because the transverse force for compression of the tongues is reduced so that they can be compressed more easily and the friction forces between the inner side of the central opening of the data disk and the snap-on cams is reduced.

It is moreover advantageous that a compression zone is provided as a component of each radial area and causes upon lowering of the fastening zone a radial length compensation. Upon lowering of the fastening zone in the vertical direction the length of the radial sections changes. This length difference is compensated by the compression zone. The length compensation reduces the load on the material of the radial sections and therefore is beneficial for the service life of the storage case.

Finally, it is proposed that below the support and at a minimal spacing below the fastening zone two push-through openings arranged opposite one another are provided for a preferably rod-shaped securing element that blocks lowering of the fastening zone and in this way prevents removal of the data disk. Such a securing element serves as a theft protection because it prevents access to the stored data disk in that the fastening zone in the case of inserted rod-shaped securing element can no longer be lowered. The data disk no longer can be released by applying pressure with a finger without prior removal of the rod-shaped securing element.

BRIEF DESCRIPTION OF THE DRAWINGS

Further details and advantages of the invention result from the following description of the correlated drawings in which a preferred embodiment of the storage case according to the invention is illustrated in an exemplary fashion. The drawings show in.

DESCRIPTION OF PREFERRED EMBODIMENTS

Figure 1:
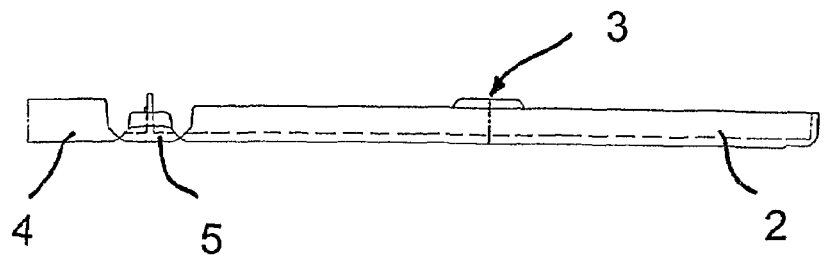
FIG. 1 a side view showing only partially an open storage case for one or also for several CDs or DVDs.

In FIG. 1 a storage case is shown in a side view which is comprised essentially of a lid 4, a double hinge 5, a base 2, and a fastening zone 3. The case is a single piece of, for example, polypropylene.

Figure 2:
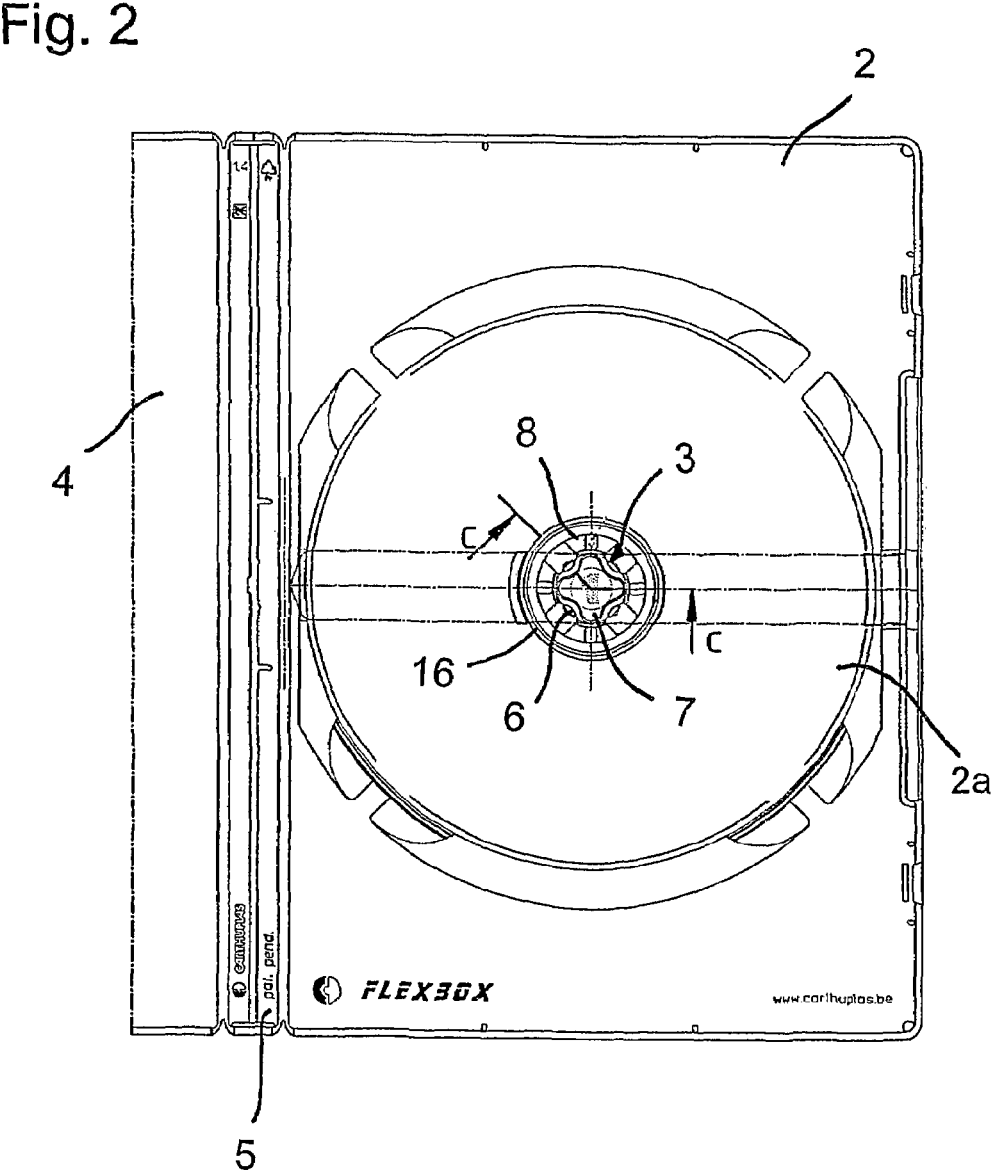
FIG. 2 a plan view onto the open storage case according to FIG. 1.

As can be seen best in FIG. 2, the fastening zone 3 forming a fastening element is arranged at the center of the base 2. The fastening zone 3 is comprised essentially of four tongues 6 distributed about its circumference and a central pressure element 7. By means of four springy radial sections 8 arranged exclusively in segments $S_1$ (FIG. 3a) of the fastening zone 3, the fastening zone is connected to a rigid support 16 that, in turn, is rigid relative to the base plate 2a of the base 2.

Figure 3:
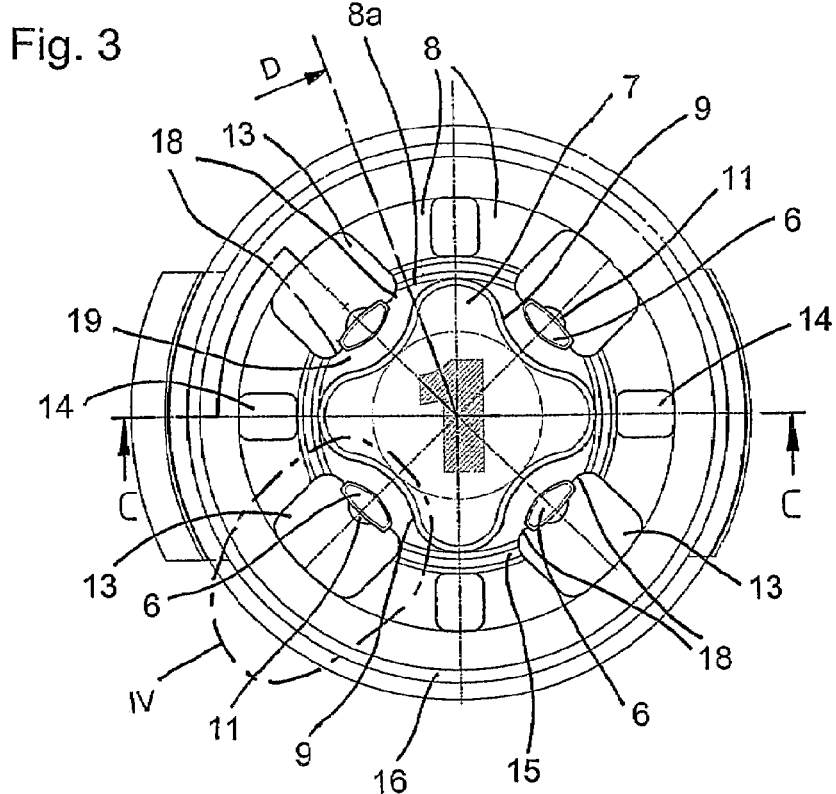
FIG. 3 an enlarged detail view of the central fastening zone of a storage case in plan view according to FIG. 2.
Figure 3A:
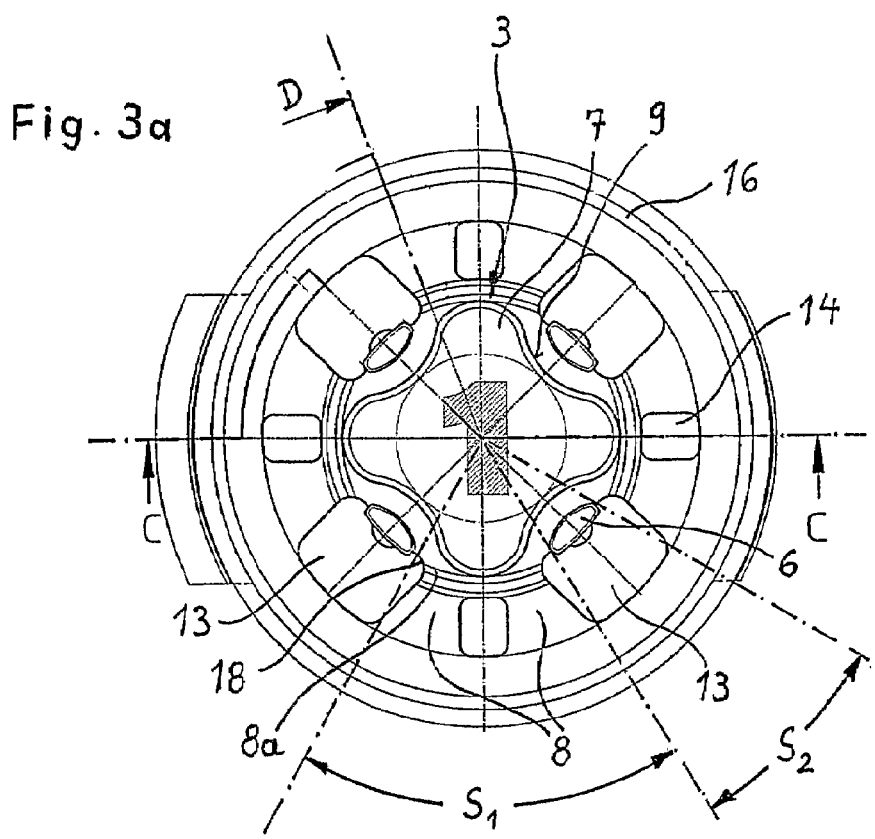
FIG. 3a a further illustration in accordance with FIG. 3.

As can be seen best in FIGS. 3 and 3a, the pressure element 7 that is substantially rigid is provided at its circumference with recesses 9 that are closed in the downward direction by a bottom plate 19. An upwardly extending tongue 6 with a snap-on cam 11 formed on the outer side is provided in each recess 9, respectively.

About the central pressure element 7 a compression zone 15 of the radial sections 8 is shown whose function will be explained later in more detail with the aid of FIG. 4. The compression zone 15 is not provided about the entire circumference of the fastening zone 3 but is interrupted by cutouts 13 penetrating the radial section 8.

The cutouts 13 are arranged on the same circumferential sections or segments $S_2$ as the tongues 6 and extend down to the respective bottom plate 19 of the central pressure element 7. Because of the cutout 13 each bottom plate 19 is delimited outwardly by a free edge. This free edge serves as a bending location 18 for improved spring action of the tongues 6. Each tongue 6 is therefore arranged centrally between its two bending locations 18 in the edge area of the bottom plate 19.

Because of the cutout 13, the bottom plate 19, and thus also the tongue 6 projecting upwardly from the bottom plate 19, is substantially kept free of tension upon lowering of the central pressure element 7 despite the bending action in the springy radial sections 8. The force flow that occurs upon pressing on the pressure element 7 extends through the circumferential areas or segments $S_1$ that have no cutouts 13. The other segments $S_2$ (FIG. 3*a*) are outside of the flow of force and thus remain almost free of tension so that the tongues 6 are also tension-free. This effect is further assisted by additional cutouts 14 centrally in the radial section 8 and thus centrally in the segment $S_1$. The cutouts 14 improve also the elasticity of the radial sections 8.

Figure 4:
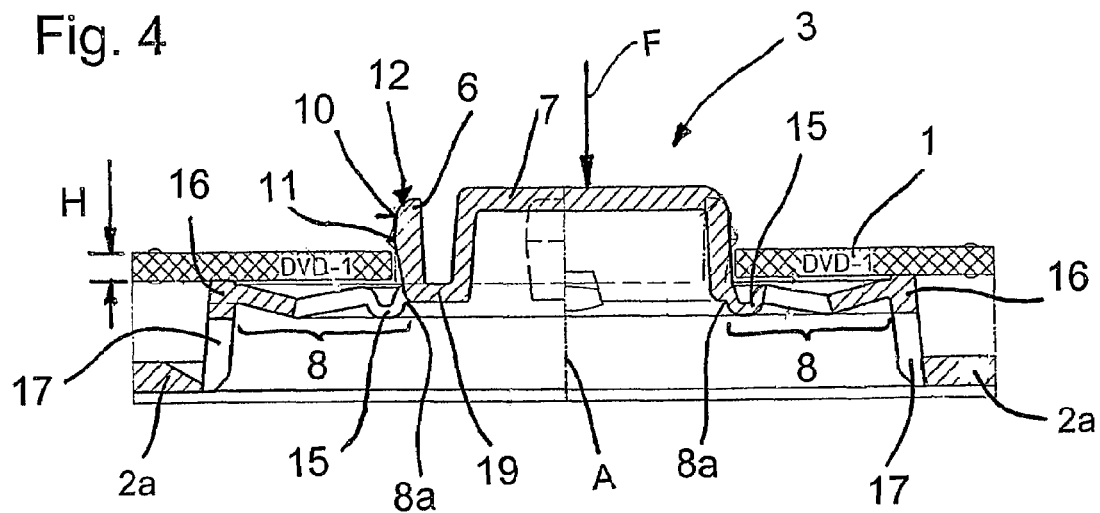
FIG. 4 a section illustration of the fastening zone along the angled section line C-C in FIG. 3.
Figure 5:
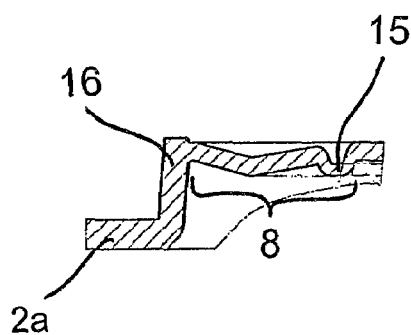
FIG. 5 a partial illustration of a section of the fastening zone along the section line D in FIG. 3.

FIG. 4 best illustrates the function of the compressions zone 15. When the fastening zone 3 is lowered by applying the force F by at least the height H of the stored data disk 1 along the central axis A in the vertical direction, the radial spacing between the inner end 8*a* of the slightly V-shaped radial sections 8 and the rigid support 16 decreases. The compensation of the resulting length difference is compensated by the compression zone 15 that, upon lowering as well as lifting of the fastening zone 3, behaves like a compensation spring in the radial direction. By means of the compression zone 15, overloads of the radial section 8 and of the support 16, even in the case of improper handling, are prevented, for example, when the pressure is not applied centrally onto the central pressure element 7.

Figure 6:
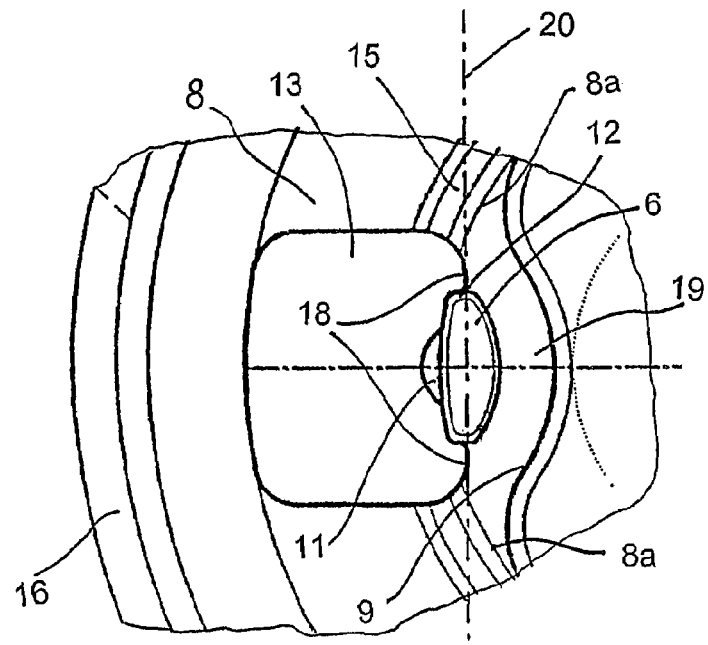
FIG. 6 an enlarged detail view IV according to FIG. 3.

The arrangement of the tongues 6 in the recesses 9 and on the bottom plates 19 is illustrated in FIG. 6. A recess 9 of the central pressure element is shown that is closed off at the bottom side by the bottom plate 19. The bending locations 18 that are formed by the recess 13 and the bottom plate 19 are arranged on a bending line 20 of the tongue 6 blow the tongue. It can be seen that the cutout 13 separates the compression zone 15 completely so that the portion of the fastening zone 3 that is positioned radially inwardly relative to the cutout 13, i.e., essentially the bottom plate 19 and the tongue 6, does not contribute to the transmission of the actuation force F from the central pressure element 7 onto the springy radial section 8. The tongue 6 is therefore within the segment $S_2$ (FIG. 3*a*) of the fastening zone 3 that is outside of the force flow so that it remains completely free of any tension when pressure is applied onto the central pressure element 7 with no data disk 1 being inserted.

The release and removal of a data disk 1 received by the fastening zone 3 will be explained in the following with the aid of FIG. 4 that shows the fastening zone 3 in section. Initially, the data disk 1 is secured positively by the central pressure element 7, the tongues 6, the support 16 and the engagement by the snap-on cams 11 so that the data disk 1 is secured in the horizontal direction as well as in the vertical direction. By applying a force F acting in the vertical direction onto the central pressure element 7, the pressure element is lowered along the central axis A by compression of the compression zone 15. During lowering, first the snap-on cams provided at their bottom side with slanted portions and projecting past the upper edge of the central opening come into contact with the data disk 1. The data disk 1 therefore exerts an inwardly oriented force on the tongues 6. This force creates a rotary moment about the lower end of the tongues 6 inwardly in the radial direction. This causes the tongue 6 to pivot about the bending location 18 and to move elastically inwardly until the engagement is released.

Only after the inwardly deflecting snap-on cam 11 has passed entirely with friction the central opening of the data disk 1, the tongue 6 will spring back outwardly and the data disk 1 is completely released, i.e., the positive locking action in the vertical direction is canceled. The snap-on cams 11 engage in this position with their topside the lower edge of the center opening of the stored data disk 1. When the actuation force F is now removed, the fastening zone 3 will spring back in the upward along the central axis A of the fastening element while the compression zone 15 is stretched and the data disk 1 is entrained upwardly. In this lifted position the outer rim of the data disk 1 can be gripped and the data disk can be removed.

Since the frictional force acting between the snap-on cams 11 and the data disk 1 depends on the normal forces acting thereon and is determining in regard to the total removal force acting on the data disk, it should be kept as low as possible. The snap-on cams 11 are therefore provided at the bottom side with a slanted portion having preferably an angle of significantly less than 45° relative to the vertical line. The upper slanted portion of the snap-on cams 11, on the other hand, is positioned at an angle to the vertical that is significantly greater than 45° so that a safe entrainment of the data disk 1 upon restoring of the fastening zone 3 is ensured. For reducing the frictional forces acting when lowering the fastening zone 3, the tongues 6 themselves are moreover elastically configured in the radial direction so that even at minimal transverse force they can elastically move inwardly.

Since the spacing between the central pressure element 7 or the inner end 8*a* of the radial area 8 and of the rigid support 16 is as minimal as possible, the frictional forces acting when lowering the central pressure element 7 are minimal. In this way, a minimal bending of the center of the data disk 1 will occur and thus a gentle treatment of the data disk. Moreover, the point of release is precisely defined and can be felt easily by the user. Preferably, the rigid support 16 is positioned radially farther inwardly than the annular zone of the CD or DVD where digital information is written.

Moreover, as a result of the arrangement of the central pressure element 7 and the rigid support 16 slanted positioning or canting of the data disk 1, for example, by non-central actuation of the central pressure element 7, is prevented as much as possible so that the removal can be performed reliably independent of the dexterity of the user.

LIST OF REFERENCE NUMERALS

1 data disk
2 base
2*a* base plate
3 fastening zone
4 lid
5 double hinge
6 tongue
7 pressure element
8 radial section
8*a* inner end of radial sections 9 recess
10 outer side
11 snap-on cam
12 slanted portion
13 cutout
14 cutout
15 compression zone
16 support
17 push-through opening
18 bending location
19 bottom plate
20 bending line of the tongue
F force
A central axis
H total height of received data disks
$S_1$ segment
$S_2$ segment

What is claimed is:

1. A storage case comprising:
a base receiving at least one data disk that stores digital information;
a lid that is parallel to the base;
wherein the base comprises a substantially rigid base plate with a support for the at least one data disk, wherein the support is formed on the base plate and is rigid;
wherein the base further comprises a fastening zone arranged at a center of the base plate and connected to the base plate by springy radial sections;
wherein the fastening zone has a centrally arranged rigid pressure element and tongues distributed about the pressure element, wherein the tongues secure positively the at least one data disk;
wherein the tongues have integrally formed snap-on cams that project slightly past an edge of a central opening of the at least one data disk when resting on the support;
wherein the snap-on cams each have a bottom side with a slanted portion;
wherein the springy radial sections have inner ends connected directly to the pressure element;
wherein the tongues are connected by at least one bending location to the inner ends of the springy radial sections; and
wherein the support is arranged directly about the radial sections so as to be proximal to the edge of the central opening of the at least one data disk;
wherein, when applying onto the pressure element a pressure force acting in a direction that is perpendicular to the base plate without a data disk being inserted, the tongues move with the pressure element exclusively in said direction without moving relative to the pressure element.

2. The storage case according to claim 1, wherein the springy radial sections extend between the support and the fastening zone.

3. The storage disk according to claim 1, wherein the fastening zone is lowered by applying said pressure force along a central axis of the pressure element and opposite to a return force of the springy radial sections.

4. The storage case according to claim 3, wherein a maximum lowering travel of the fastening zone is at least identical to a total height of the at least one data disk.

5. The storage case according to claim 1, wherein the pressure element is a rigid pin that is provided with recesses distributed about a circumference of the rigid pin, wherein the recesses are closed off in a downward direction by a bottom plate, respectively.

6. The storage case according to claim 5, wherein the recesses each have at least one of the tongues arranged therein and wherein the tongues are oriented substantially parallel to a central axis of the fastening zone.

7. The storage case according to claim 6, wherein circumferential areas of the pressure element remaining between the recesses provide a centering action for the at least one data disk.

8. The storage case according to claim 7, wherein the circumferential areas and the tongues center the at least one data disk.

9. The storage case according to claim 1, wherein the tongues are elastic in a radial direction of the pressure element.

10. The storage case according to claim 5, wherein, in a circumferential direction of the fastening zone, the fastening zone has first segments and second segments that are arranged alternatingly, wherein within the first segments the radial sections are connected to the pressure element and wherein in the second segments the tongues are arranged.

11. The storage case according to claim 10, wherein cutouts are provided between the radial sections in a circumferential direction of the fastening zone.

12. The storage case according to claim 11, wherein the tongues and the cutouts are provided on the second segments.

13. The storage case according to claim 11, wherein the tongues are located on the bottom plate at an edge of the cutouts.

14. The storage case according to claim 11, wherein the at least one bending location extends only in circumferential area of the fastening zone provided with the cutouts, wherein remaining circumferential areas of the fastening zone are substantially rigid.

15. The storage case according to claim 1, wherein the springy radial sections each have a compression zone that provides upon lowering of the fastening zone a radial length compensation.

* * * * *